(12) United States Patent
Blackman et al.

(10) Patent No.: US 10,221,302 B2
(45) Date of Patent: Mar. 5, 2019

(54) SOLID POLYMERIC HIGHLY DURABLE SURFACING

(71) Applicant: E I DU PONT DE NEMOURS AND COMPANY, Wilmington, DE (US)

(72) Inventors: Gregory Scott Blackman, Media, PA (US); Hee Hyun Lee, Wilmington, DE (US); Keith William Pollak, Lewiston, NY (US); Michael T Pottiger, Media, PA (US); Timothy Scott Wyant, Cheektowaga, NY (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/651,388

(22) Filed: Jul. 17, 2017

(65) Prior Publication Data

US 2018/0163025 A1    Jun. 14, 2018

Related U.S. Application Data

(60) Provisional application No. 62/433,298, filed on Dec. 13, 2016, provisional application No. 62/529,631, filed on Jul. 7, 2017.

(51) Int. Cl.
*C08K 9/02* (2006.01)
*C08K 3/22* (2006.01)

(52) U.S. Cl.
CPC ............... *C08K 9/02* (2013.01); *C08K 3/22* (2013.01); *C08K 2003/2227* (2013.01); *C08K 2201/005* (2013.01)

(58) Field of Classification Search
CPC ......... C09C 1/40; C09K 9/02; C01P 2004/62; C01P 2004/84; C08K 2003/2227

USPC ........................................................ 524/854
See application file for complete search history.

(56) References Cited

U.S. PATENT DOCUMENTS

| 3,847,865 A | 11/1974 | Duggins |
| 4,915,987 A * | 4/1990 | Nara ................ B01F 7/04 241/189.1 |
| 5,665,425 A * | 9/1997 | Nishibori ............ B29B 15/08 427/180 |
| 5,800,910 A | 9/1998 | Harke et al. |
| 9,365,724 B2 | 6/2016 | Rose et al. |
| 9,371,425 B2 | 6/2016 | Rose et al. |
| 2006/0116279 A1 * | 6/2006 | Kogoi ................ B01J 21/063 502/103 |
| 2008/0063850 A1 | 3/2008 | Vilchis Ramirez et al. |
| 2015/0218343 A1 | 8/2015 | Rose et al. |
| 2015/0329706 A1 | 11/2015 | Rose et al. |

FOREIGN PATENT DOCUMENTS

| JP | 03-174347 A | 7/1991 |
| JP | 2005126293 A | 5/2005 |

* cited by examiner

*Primary Examiner* — William K Cheung

(57) ABSTRACT

A solid surface comprises (i) a crosslinked acrylic or unsaturated polyester resin present in an amount no greater than 51 or 52 volume fraction percent, and (ii) no greater than 48 or 49 volume fraction percent of inorganic filler particles that are modified with discrete functional particles that are bound, or adhered to the filler particles, the filler particles being distributed evenly throughout the solid surface wherein (a) 95-99 volume fraction percent of the filler particles has a major dimension in the range of from 0.5 to no greater than 10 microns, (b) the D50 of the filler particles is from 0.5-2.5 microns, (c) the D90 of the filler particles is equal to or less than 10 microns and (d) the filler particles are modified with discrete functional particles that are bound, or adhered to the filler particles.

8 Claims, No Drawings

SOLID POLYMERIC HIGHLY DURABLE SURFACING

BACKGROUND

1. Field of the Invention

This invention pertains to a highly durable solid surface that is useful in homes, medical buildings, hotels and restaurants.

2. Description of Related Art

Prior art in this field describes technologies that impart durability to the surface of materials either through inclusion of hard fillers or by application of a hard coating.

U.S. Pat. No. 5,800,910 to Harke et al describes plastic molded articles comprising a polymer matrix filled with inorganic fillers, the filler content being 50 to 90% by weight in relation to the filled matrix, it is suggested that the filler comprise two filler fractions (a) and (b), wherein the filler fraction (a) has a particle size distribution with 98% by weight of the particles having a particle size no greater than 150 micrometers and is distributed essentially uniformly in the polymer matrix, and wherein the filler fraction (b) comprises particles having a particle size of approximately 300 micrometers to approximately 3000 micrometers wherein the proportion of the filler fraction (b) is approximately 1 to 35% by weight of the total filler content, and wherein the proportion of the filler fraction (b) in an outer surface layer of the molded article is enriched to at least 30% by weight in relation to the total mass of the filled matrix.

Japanese patent publication JP2005126293 (A) to Kojima et al discloses an artificial marble having excellent flaw resistance and durability. The marble has a transparent layer on the surface of a base material comprising a thermosetting resin composition. The transparent layer contains a thermosetting resin and filler, and has a thickness of 1-5 mm.

Japanese patent publication JP1991-174347 to Tanaka et al teaches a formed object comprising an acrylate resin binding material and a metal hydroxide bulking agent as a base resin 100 weight percent, characterized in that the formed object is obtained by adding and distributing 1 weight percent to 10 weight percent of the base resin, a powdered glass which particle diameter is distributed in the range of 1 micron to 150 microns, having from 10 weight percent to 30 weight percent of rough grain with a particle diameter of 50 microns or more. The formed object is preferably obtained by unevenly distributing the rough grain powdered glass on one surface side of the formed object, and further, the powdered glass is a complicated polygonal powder obtained by pulverization, and has a fresh surface.

United States Patent Application Publication No. 2015/0218343 to Rose et al discloses a filler modified with functional particles in a high energy dry-blending process through collisions of sufficient energy to bound, adhere, or otherwise associate the pigment particles to the filler.

United States Patent Application Publication No. 2015/0329706 to Rose et al pertains to a process for manufacturing a filled polymeric material comprising a polymeric matrix and filler modified with functional particles in a high energy dry-blending process through collisions of sufficient energy to bound, adhere, or otherwise associate the pigment particles to the filler.

There remains an ongoing need to provide enhanced durability to solid surfacing. The invention described herein improves, among other attributes, the scratch resistance of the solid surface material while maintaining its woodworkability. The improved performance is inherent to the material and persists throughout the bulk of the article.

SUMMARY OF THE INVENTION

This invention pertains to a solid surface comprising
(i) a crosslinked acrylic or unsaturated polyester resin present in an amount no greater than 52 volume fraction percent, and
(ii) no greater than 48 volume fraction percent of inorganic filler particles distributed evenly throughout the solid surface wherein
  (a) 95-99 volume fraction percent of the filler particles has a major dimension in the range of from 0.5 to no greater than 10 microns or from 1 to no greater than 5 microns or from 1 to no greater than 2 microns,
  (b) the D50 of the filler particles is from 0.5 to 2.5 microns,
  (c) the D90 of the filler particles is equal to or less than 10 microns, and
  (d) the filler particles are modified with discrete functional particles that are bound, or adhered to the filler particles.

DETAILED DESCRIPTION

Solid Surface

By solid surface is meant a three-dimensional non-flexible rigid surface. Typically, the solid surface comprises (i) from 45 to 80 volume fraction percent of organic polymer resin, typically polymethylmethacrylate or unsaturated polyester and (ii) from 25 to 55 volume fraction percent of inorganic filler particles distributed evenly throughout the solid surface.

In one embodiment, the solid surface comprises
(i) a crosslinked acrylic or unsaturated polyester resin present in an amount no greater than 52 volume fraction percent, and
(ii) no greater than 48 volume fraction percent of inorganic filler particles distributed evenly throughout the solid surface wherein
  (a) 95-99 volume fraction percent of the filler particles has a major dimension in the range of from 0.5 to no greater than 10 microns or from 1 to no greater than 5 microns or from 1 to no greater than 2 microns,
  (b) the D50 of the filler particles is from 0.5 to 2.5 microns,
  (c) the D90 of the filler particles is equal to or less than 10 microns, and
  (d) the filler particles are modified with discrete functional particles that are bound, or adhered to the filler particles.

In another embodiment, the solid surface comprises
(i) a crosslinked acrylic or unsaturated polyester resin present in an amount no greater than 51 volume fraction percent, and
(ii) no greater than 49 volume fraction percent of inorganic filler particles distributed evenly throughout the solid surface wherein
  (a) 95-99 volume fraction percent of the filler particles has a major dimension in the range of from 0.5 to no greater than 10 microns or from 1 to no greater than 5 microns or from 1 to no greater than 2 microns,
  (b) the D50 of the filler particles is from 0.5 to 2.5 microns, (c) the D90 of the filler particles is equal to or less than 10 microns, and (d) the filler particles are modified with discrete functional particles that are bound, or adhered to the filler particles Organic Polymer Resin One of the most common organic polymer resins is polymethylmethacrylate (PMMA) polymer or "acrylic" copolymer. The PMMA arises from polymerization of an acrylic composition. The preparation of a polymerizable acrylic composition typically involves a syrup containing methyl methacrylate polymer dissolved in monomeric methyl methacrylate (MMA) also known as polymer-in-monomer syrup, a polymerization initiator, and an inorganic filler. Such a composition and method of making is disclosed in U.S. Pat. No. 3,847,865 to Duggins. The acrylic polymer constituent may further comprise methyl methacrylate homopolymers and copolymers of methyl methacrylate with other ethylenically unsaturated compounds (e.g., vinyl acetate, styrene, alkyl acrylates, acrylonitrile, alkyl methacrylates, multifunctional acrylic monomers such as alkylene dimethacrylates and alkylene diacrylates). In addition, the polymer constituent can contain small amounts of other polymers including minor amounts of polyester or styrenic polymers or copolymers.

Another common organic polymer resin is unsaturated polyester (UPE). UPE resins are comprised of polyester polymers or copolymers that incorporate covalently bound unsaturation, like a carbon-carbon double bond, dissolved in polymerizable styrenic monomers, like styrene.

Either resin composition can be cast or molded and cured to produce a sheet structure with an important combination of properties including translucency, weather resistance, resistance to staining by common household materials, flame resistance, and resistance to stress cracking. In addition, the cured article can be easily machined by conventional techniques including sawing and sanding. This particular combination of properties makes such a structure particularly useful as kitchen or bathroom countertops, back splash panels, wall cladding, molded articles such as towel racks, and the like.

Thermoset

The organic polymer resins described above are typically crosslinked, creating a polymeric network referred to as a thermoset. Key properties of thermosets are strength retention at elevated temperatures and dimensional stability over time while subject to a variety of environmental conditions. Such properties make solid surface products desirable in homes and other buildings.

Filler

By "filler" is meant any material that is solid at room temperature and atmospheric pressure, used alone or in combination, which does not react chemically with the various ingredients of the composition and which is insoluble in these ingredients, even when these ingredients are raised to a temperature above room temperature and in particular to their softening point or their melting point. A preferred filler is an inorganic filler.

In one embodiment, the inorganic filler particle is alumina trihydrate (ATH). A calcined ATH prepared by a thermal treatment process to remove water is also suitable.

In other embodiments, the inorganic filler particle is alumina, silica, talc or quartz.

In another embodiment, the filler is micronized organic polymers like polyether ether ketone or polytetrafluoroethylene.

In all embodiments, the filler is modified with discrete functional particles such as an adhered colorant, like a pigment or dye, the discrete functional particles being bound, or adhered to the filler particles. The process for making the modified filler is performed in a step prior to production of the solid surface product as exemplified in U.S. Pat. Nos. 9,365,724 B2; 9,371,425 B2, and United States Patent Publications 2015/329706 and 2015/218343.

One means of characterizing a Particle Size Distribution (PSD) is the D50, also known as the mass median diameter or the medium value of the PSD. It is the weighted average diameter for particles with a normal or lognormal distribution of diameters. Similarly, the D90 is the diameter which accounts for 90% of the cumulative PSD.

At least 95 or 99 volume fraction percent of the filler particles has a major dimension in the range of from 0.5 to no greater than 10 microns or from 1 to no greater than 5 microns or from 1 to no greater than 2 microns. Within these ranges the D50 is 0.5 to 2.5 microns and the D90 is equal to or less than 10 microns. This size is considerably smaller than the particle size currently used in the trade, which has a D50 of about 10-50 microns and a D90 of sometimes greater than 100 microns.

The filler particles are distributed evenly throughout the solid surface, that is to say their distribution throughout the bulk of the solid surface material is uniform. They are not present only as a surfacing layer.

Special Processing Aids

As is the nature of particulates in mixtures, those with small diameters impart a high viscosity to the mixture. In some embodiments, processing aids are added to the mixture so that the viscosity is controlled. Examples of such processing aids can be found in US patent application publication number 2008/0063850 A1. Selection of the processing aid is specific to the media (e.g., acrylic resin, UPE resin), the filler type & loading, and the target viscosity range or desired flow behavior (e.g. shear thinning, Newtonian).

Other Components of the Solid Surface

The surface may further comprise additional components such as a pigment, visible particulate, including decorative particulate, coupling agent, comonomer, or crosslinker.

Optionally, the solid surface material may contain aesthetic components such as pigments or decorative particles. The term "pigment" means a colorant that is insoluble in the medium in which it is used, and therefore of a particulate nature encompassing the physical and chemical properties thereof (e.g. surface charge and topology). The amount of pigment present is that quantity sufficient to provide the desired color effect but is typically from 0.05 to 2.5 volume fraction percent. Pigments can be added to the reactive mix in a powder form but are more commonly added as suspensions or dispersions within a carrier liquid. The solid surface material may also contain macroscopic decorative particles known to the industry as "crunchies". Crunchies are various filled and unfilled, pigmented or dyed, insoluble or crosslinked chips of polymers such as ABS resins, cellulose esters, cellulose ethers, epoxy resins, polyethylene, ethylene copolymers, melamine resins, phenolic resins, polyacetals, polyacrylics, polydienes, polyesters, polyisobutylenes, polypropylenes, polystyrenes, urea/formaldehyde resins, polyureas, polyurethanes, polyvinyl chloride, polyvinylidene chloride, polyvinyl esters and the like. Other useful macroscopic translucent and transparent decorative particles are natural or synthetic minerals or materials such as agate, alabaster, albite, calcite, chalcedony, chert, feldspar, flint quartz, glass, malachite, marble, mica, obsidian, opal, quartz, quartzite, rock gypsum, sand, silica, travertine, wollastonite and the like; cloth, natural and synthetic fibers; and pieces of metal.

A coupling agent enhances performance properties of the solid surface material. Suitable coupling agents for use in this invention are functionalized (meth)acrylic esters such as phosphoric acid 2-hydroxyethyl methacrylate ester or 3-(trimethoxysilyl)propyl methacrylate. These are typically present in an amount of less than 1 volume fraction percent. The coupling agent can be either added to the reactive mixture or pre-applied to the filler surface. The coupling agent comonomer will copolymerize with the resin and bond to the filler surface.

Comonomers are often incorporated into the organic polymer resin to modify performance properties of the solid surface material. One common example is n-butyl acrylate added to acrylic resin for enhancing the thermal stability of the solid surface material. Comonomers are typically present in an amount of less than 2 volume fraction percent.

A crosslinker enhances the integrity of the article at elevated temperatures. Suitable acrylic crosslinkers for use in this invention are polyfunctional (meth)acrylic esters such as ethylene glycol dimethacrylate and trimethylolpropane trimethacrylate. In UPE resins, the unsaturated polyester is the main crosslinker A solid surface comprising ATH having a particle size as described above in either a PMMA network or UPE resin has been found to be highly durable and easy to repair. This can be effected simply by the use of an abrasive pad such as Scotch-Brite™. Such a surface is sometimes known as a renewable surface.

Method of Making a Solid Surface

A solid surface, that is renewable, can be made by the steps of
  (i) providing an uncured polymeric composition comprising
    (a) from 0 to 15 volume fraction percent of PMMA,
    (b) from 10 to 40 volume fraction percent of MMA,
    (c) from 1 to 50 volume fraction percent of inorganic filler particles modified with discrete functional particles that are bound, or adhered to the filler particles, the filler being distributed evenly throughout the solid surface wherein at least 95 volume fraction percent of the filler particles has a major dimension in the range of from 0.5 to no greater than 10 microns or from 1 to no greater than 5 microns or from 1 to no greater than 2 microns,
    (d) from 0.1 to 2 volume fraction percent of a curing agent.
  (ii) pouring the composition of step (i) into molding receptacle, and
  (iii) curing the composition at a temperature of from ambient to 80 degrees C. for between 3 and 60 minutes to solidify the composition to form a solid surface.

In some embodiments, the inorganic filler is present in an amount of from 15 to 50 volume fraction percent.

An unsaturated polyester or acrylic-modified polyester solid surface, that is renewable, can be made by the steps of
  (i) providing an uncured polymeric composition comprising
    (a) from 0 to 15 volume fraction percent of PMMA,
    (b) from 10 to 40 volume fraction percent of UPE resin,
    (c) from 1 to 50 volume fraction percent of inorganic filler particles modified with discrete functional particles that are bound, or adhered to the filler particles, the filler particles being distributed evenly throughout the solid surface wherein at least 95 volume fraction percent of the filler particles has a major dimension in the range of from 0.5 to no greater than 10 microns or from 1 to no greater than 5 microns or from 1 to no greater than 2 microns,
    (d) from 0.1 to 2 volume fraction percent of a curing agent.
  (ii) pouring the composition of step (i) into molding receptacle, and
  (iii) curing the composition at a temperature of from ambient to 80 degrees C. for between 3 and 60 minutes to solidify the composition to form a solid surface.

In some embodiments, the inorganic filler is present in an amount of from 15 to 50 volume fraction percent.

Test Methods

Four-Step Scratch Method

The scratch test used a Micro-Scratch Tester from CSM Instruments (Anton Paar) with a 1 mm alumina ball as an indenter. The indenter was cleaned prior to each experiment by sonication for 30 minutes in reagent grade isopropanol, sonication for 30 minutes in HPLC grade water, and UV ozone treatment for 10 minutes. Zygo optical profilometry images were collected to qualify the indenter prior to use.

At least three separate scratches are performed for each sample and each scratch has four distinct load steps. In each case, three passes across the surface were performed under a controlled load. The first pass, or pre-scan, records the initial undamaged surface profile of the sample. During the second pass, the scratch is created with four load steps of 0.1, 10, 20, and 30N. The scratches are 16 mm long with a 4 mm portion for each load step. The third pass, or post-scan, is performed to record the damage about 4 minutes later.

The penetration depth is calculated by subtracting the initial pre-scan profile from the displacement during the scratch. The residual depth is calculated by subtracting the post-scan displacement from the pre-scan. The pre-scan and post-scan are at a constant 0.1 N load, which is below the plastic deformation threshold. The raw data from multiple scratches are pooled and Anova calculations are performed to statistically determine whether the mechanical performance has improved.

ASTM G171-03 (2009) Standard Test Method for Scratch Hardness of Materials Using a Diamond Stylus A hemispherical diamond tip is dragged across a surface with a controlled normal load. In the original ASTM method an indenter with an apex angle of 120 degrees and a hemispherical tip of 200 microns radius is specified. In our work we used the Anton Paar microscratch test described above and a 1 mm diameter (500 micron radius) alumina sphere. The scratch hardness is calculated by dividing the normal force by the projected area of the indenter during the scratch using the following formula:

$$H_s = \frac{8P}{\pi w^2}$$

The normal load is in Newtons and the width of the scratch (2×the radius of the contact area) is in meters, so the scratch hardness has the units of pressure in Pascals. Typical loads are a few Newtons. Dark field imaging is used to measure the scratch width at the center of each load step.

Scratch Visibility

There is no fundamental understanding about the relative importance of contrast vs size, but in the present work we use the following empirical formula to describe the visibility of a scratch:

Visibility=[$\sqrt{width}$×(scratch grey level$_{avg}$−background grey level$_{avg}$)]

A convenient way to measure scratch visibility was developed and refined as part of this project. Dark field images from a conventional compound optical microscope in combination with image processing gives accurate measurements of both the average width and the contrast levels in various parts of the image.

EXAMPLES

The formulations in the examples were prepared using the following, general procedure. To a reaction kettle, a reactive, organic resin was prepared. In cases of acrylic products, typical reactive resins comprised methylmethacrylate, methacrylate-functionalized crosslinker, adhesion promoting comonomer, peroxide, and polymethylmethacrylate. Optionally, a cure rate accelerant might be included. In the cases of unsaturated polyester or acrylic modified unsaturated polyester, typical reactive resins comprised an unsaturated polyester polymer, styrene, peroxide, and cure rate accelerants. Optionally, an acrylic polymer or copolymer might be included. The components of the resin were stirred vigorously and then functionalized particulate filler added to the mixture under continued agitation. Once the organic compounds were homogenized and the mineral compounds were well dispersed, the mixture was placed under vacuum. After the mixture was degassed, the peroxide accelerator was added to the stirring mix. Then the activated mix was cast into an insulated mold where the reactive mix cured and solidified.

Comparative Example 1

The reaction product resulting in a composite comprised of 44.5 volume percent non functionalized Alumina Trihydrate (WH311, 40 micron mean particle diameter from Alcan), 55.5 volume percent thermoset acrylic, and less than 1% black pigment (carbon black).

Example 1

The reaction product resulting in a composite comprised of 40.4 volume percent carbon black functionalized Alumina Trihydrate (Hydral 710, 2 micron mean particle diameter from J.M. Huber Corporation) and 59.6 volume percent thermoset acrylic.

Comparative Example 2

The reaction product resulting in a composite comprised of 44.5 volume percent Alumina Trihydrate (WH311, 40 micron mean particle diameter from Alcan), 55.5 volume percent thermoset acrylic, and less than 1% white pigment (TiO$_2$).

Example 2

The reaction product resulting in a composite comprised of 40.4 volume percent Zinc Sulfide functionalized Alumina Trihydrate (Hydral 710, 2 micron mean particle diameter from J.M. Huber Corporation), 59.6 volume percent thermoset acrylic.

When subjected to a scratch force of 20N, the inventive examples having filler particles modified with discrete functional particles wherein the nominal filler mean particle size is 2 micrometers will show an unexpected and surprising improved (lower) scratch visibility compared to the comparative examples with a filler particle sizes of 35 microns. It is believed that the combination of particle size range and particle size distribution are necessary elements to provide effective scratch resistance.

| Measurement | Comparative Example 1 | Example #1 | Comparative Example 2 | Example #2 |
|---|---|---|---|---|
| Scratch Perception* | 2390 | 590 | 344 | 210 |

*Scratch Perception is the product of the visual contrast (i.e., difference in mean grey level of unscratched surface and the center of the scratch) and the square root of the scratch width. Improvements are realized by reducing the Scratch Perception.
**Scratch Hardness is calculated per the method described in ASTM G171-03 (2009). Improvements are realized by increasing the Scratch Hardness.

What is claimed is:

1. A solid surface comprising
    (i) a crosslinked acrylic or unsaturated polyester resin present in an amount from 45 to 80 volume fraction percent, and
    (ii) from 25 to 55 volume fraction percent of inorganic filler particles distributed evenly throughout the solid surface wherein
        (a) 95-99 volume fraction percent of the filler particles has a major dimension in the range of from 0.5 to no greater than 10 microns or from 1 to no greater than 5 microns or from 1 to no greater than 2 microns,
        (b) the D50 of the filler particles is from 0.5-2.5 microns,
        (c) the D90 of the filler particles is equal to or less than 10 microns, and
        (d) the filler particles are modified with discrete functional particles that are bound, or adhered to the filler particles.

2. A solid surface comprising
    (i) a crosslinked acrylic or unsaturated polyester resin present in an amount from 45 to 52 volume fraction percent, and
    (ii) from 25 to 48 volume fraction percent of inorganic filler particles distributed evenly throughout the solid surface wherein
        (a) 95-99 volume fraction percent of the filler particles has a major dimension in the range of from 0.5 to no greater than 10 microns or from 1 to no greater than 5 microns or from 1 to no greater than 2 microns,
        (b) the D50 of the filler particles is from 0.5-2.5 microns,
        (c) the D90 of the filler particles is equal to or less than 10 microns, and
        (d) the filler particles are modified with discrete functional particles that are bound, or adhered to the filler particles.

3. The surface of claim 1 wherein the filler type is alumina trihydrate, alumina, silica, talc or quartz.

4. The surface of claim 1 wherein the organic polymer component includes a coupling agent comonomer that will copolymerize with the resin and bond to the filler surface.

5. The surface of claim 1 further comprising decorative components such as pigments and/or visible particulates.

6. The surface of claim 2 wherein the filler type is alumina trihydrate, alumina, silica, talc or quartz.

7. The surface of claim 2 wherein the organic polymer component includes a coupling agent comonomer that will copolymerize with the resin and bond to the filler surface.

8. The surface of claim 2 further comprising decorative components such as pigments and/or visible particulates.

\* \* \* \* \*